(12) United States Patent  (10) Patent No.: US 8,720,998 B2
Stilleke  (45) Date of Patent: May 13, 2014

(54) FITTING FOR A VEHICLE SEAT

(75) Inventor: Martin Stilleke, Recklinghausen (DE)

(73) Assignee: Keiper GmbH & Co. KG, Kaiserslautern (DE)

( * ) Notice: Subject to any disclaimer, the term of this patent is extended or adjusted under 35 U.S.C. 154(b) by 414 days.

(21) Appl. No.: 13/256,085

(22) PCT Filed: Jul. 3, 2010

(86) PCT No.: PCT/EP2010/004026
§ 371 (c)(1),
(2), (4) Date: Sep. 12, 2011

(87) PCT Pub. No.: WO2011/020523
PCT Pub. Date: Feb. 24, 2011

(65) Prior Publication Data
US 2012/0001469 A1  Jan. 5, 2012

(30) Foreign Application Priority Data
Aug. 19, 2009  (DE) .......................... 10 2009 038 562

(51) Int. Cl.
*B60N 2/02*  (2006.01)
(52) U.S. Cl.
USPC ................... 297/367 R; 297/362; 297/378.12
(58) Field of Classification Search
USPC ................................ 297/367 R, 362, 378.12
See application file for complete search history.

(56) References Cited

U.S. PATENT DOCUMENTS

| 6,799,806 | B2 |   | 10/2004 | Eppert et al. |         |
|-----------|----|---|---------|---------------|---------|
| 7,571,963 | B2 | * | 8/2009  | Peters et al. | 297/367 R |
| 8,215,712 | B2 | * | 7/2012  | Nadgouda et al. | 297/367 R |
| 8,231,176 | B2 | * | 7/2012  | Mitsuhashi    | 297/367 R |
| 8,240,768 | B2 | * | 8/2012  | Kienke et al. | 297/362 |

FOREIGN PATENT DOCUMENTS

| DE | 44 36 101 A1 | 6/1995 |
| DE | 44 11 214 A1 | 10/1995 |
| EP | 0 145 819 A1 | 6/1985 |

* cited by examiner

*Primary Examiner* — Laurie Cranmer
(74) *Attorney, Agent, or Firm* — McGlew and Tuttle, P.C.

(57) ABSTRACT

A fitting (10) for a vehicle seat, in particular for a motor vehicle seat, includes a first fitting part (11) on which a ring gear (17) is formed, a second fitting part (12) on which a gear (16) is formed, the gear meshing with the ring gear (17). The two fitting parts (11, 12) are in a transmission connection with each other. A rotatably supported rotating eccentric (27) drives a relative rolling motion of the gear (16) and of the ring gear (17) and is driven by a carrier forming a driver (21). A bearing (28) for the eccentric (27) is arranged on the edge (12b) of a receptacle (12a) of one of the two fitting parts (11, 12), wherein the edge (12b) of the receptacle (12a) is partially extended along the circumference of the edge by means of individual axial projections (12c).

20 Claims, 3 Drawing Sheets

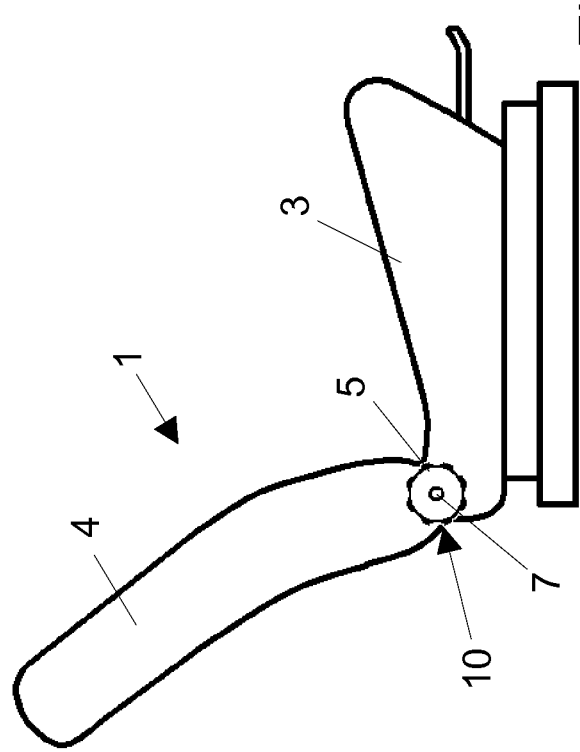

FITTING FOR A VEHICLE SEAT

CROSS REFERENCE TO RELATED APPLICATIONS

This application is a United States National Phase application of International Application PCT/EP2010/004026 and claims the benefit of priority under 35 U.S.C. §119 of German Patent Application DE 10 2009 038 562.2 filed Aug. 19, 2009, the entire contents of which are incorporated herein by reference.

FIELD OF THE INVENTION

The invention relates to a fitting for a vehicle seat having a first fitting part on which is formed a toothed ring, a second fitting part on which is formed a toothed wheel which meshes with the toothed ring, as a result of which the two fitting parts are in gear connection with each other, a rotatably supported circumferential eccentric, driven by a driver, for driving a relative rolling movement of the toothed wheel and the toothed ring and bearing for the eccentric.

BACKGROUND OF THE INVENTION

A fitting of that type is known, for example, from DE 44 36 101 A1. A ring which is received by a small collar of the second fitting part is provided as a bearing for the eccentric. The formation of such a collar becomes more difficult as the hardness of the material increases.

SUMMARY OF THE INVENTION

An object of the invention is to improve a fitting of the type mentioned in the introduction. According to the invention, a fitting for a vehicle seat, in particular for a motor vehicle seat, has a first fitting part on which is formed a toothed ring, a second fitting part on which is formed a toothed wheel which meshes with the toothed ring, as a result of which the two fitting parts are in gear connection with each other, and a rotatably supported circumferential eccentric, driven by a driver, for driving a relative rolling movement of the toothed wheel and the toothed ring, and a bearing for the eccentric. The bearing is arranged at the edge of a receptacle of one of the two fitting parts. The edge of the receptacle is partially widened along its circumference by means of individual axial projections.

As a result of the fact that the edge of the receptacle is partially widened along its circumference by means of individual axial projections, a support bearing is created which has a sufficient axial dimension to receive and support the eccentric or the bearing of the eccentric. The projections are formed from the material of the fitting part. The formation of the projections, preferably as embossments, is also possible in the case of high-strength materials. An alternating formation—with respect to the two end faces of the fitting part—of the projections optimizes the axial dimension of the partially widened edge. In the present case, the invention replaces a collar formation in a gear fitting, but the invention can in principle also be applied to other sites on the vehicle seat which have a collar.

The use of an eccentric epicyclic gear system in a fitting enables the inclination of the backrest of a vehicle seat to be adjusted continuously. The saving of a central pinion compared with a planetary gear system leads to the occurrence of a wobbling movement which is superimposed on the relative rotation of the fitting parts. The eccentric, which comprises, for example, two wedge segments braced apart by means of a spring, or a sickle-shaped member, is preferably supported, on its side opposite the afore-mentioned bearing of the one fitting part, for example on the inside, on a collar of the other fitting part.

The invention is explained in more detail hereinafter with reference to an exemplary embodiment shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a schematic representation of a vehicle seat.

DESCRIPTION OF THE PREFERRED EMBODIMENTS

Figure 1:
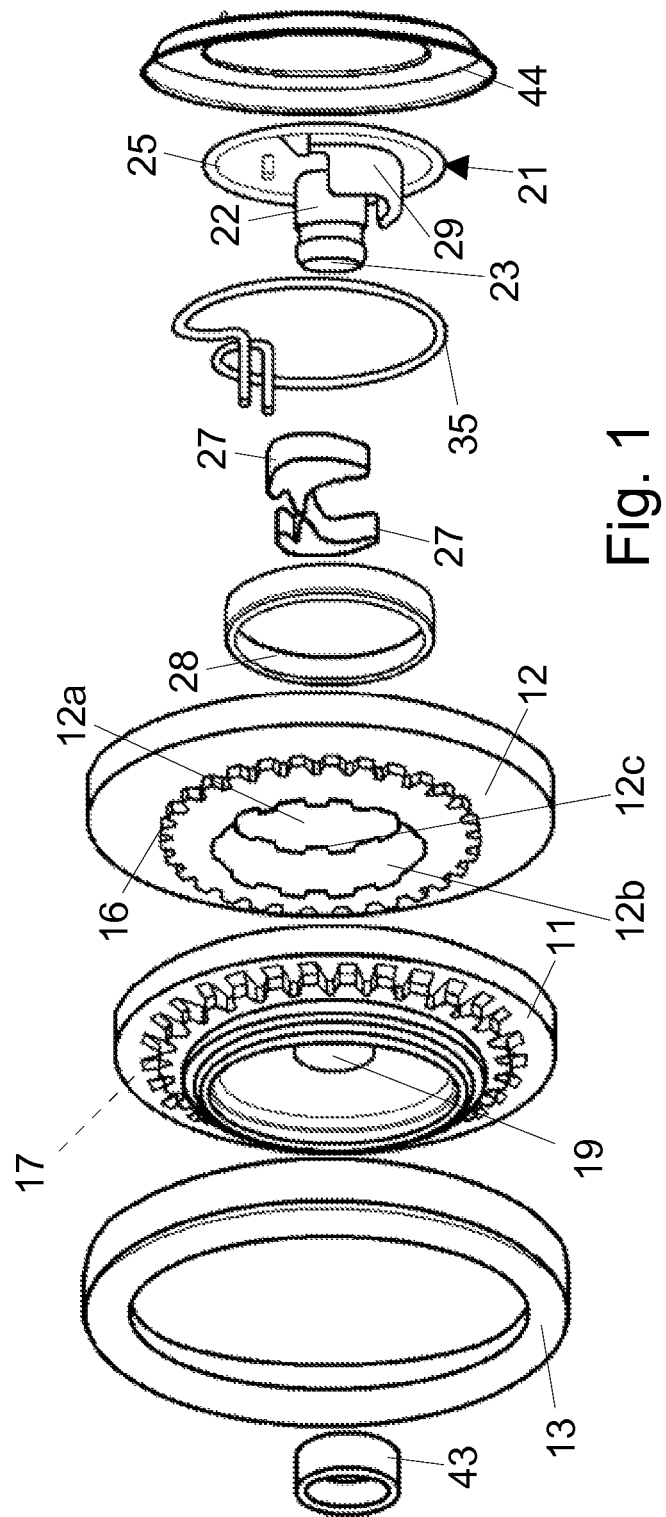
FIG. 1 is an exploded view of an exemplary embodiment according to the invention.
Figure 2:
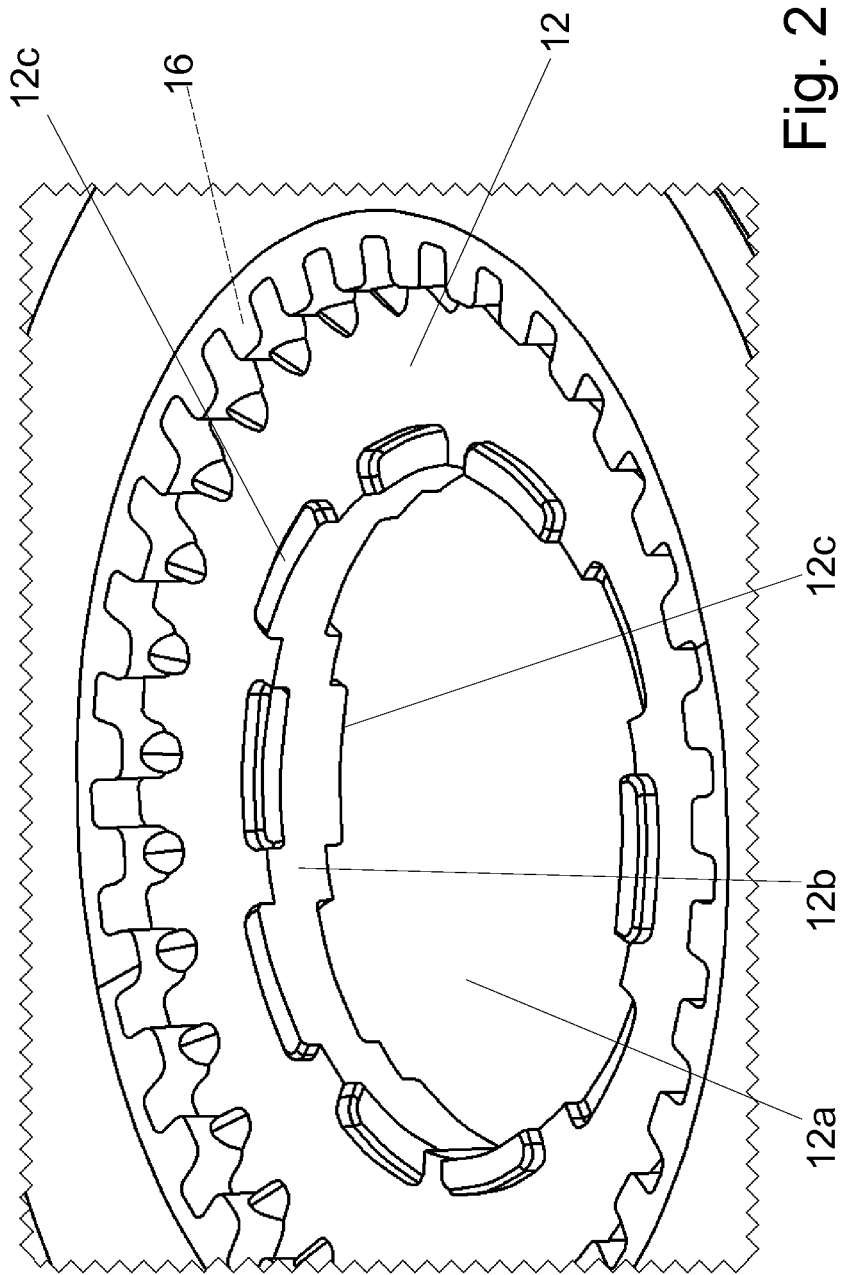
FIG. 2 is a detailed view of the second fitting part.

Referring to the drawings in particular, a vehicle seat 1 for a motor vehicle has a seat part 3 and a backrest 4, the inclination of which is adjustable relative to the seat part 3. In order to adjust the inclination of the backrest 4, a drive shaft 7, which is arranged horizontally in the transition region between the seat part 3 and the backrest 4, is rotated manually, for example, by means of a handwheel 5, or in a motor-driven manner, for example by means of an electrical motor. On both sides of the vehicle seat 1, the drive shaft 7 engages in a fitting 10 so that it is rotationally secure, in a manner which will be described later. The drive shaft 7 defines the adopted directional data of a cylinder coordinate system.

The fitting 10 is in the form of a gear fitting in which a first fitting part 11 and a second fitting part 12 are connected to each other by means of a gear unit for displacement and fixing in position, to be more precise, by means of an eccentric epicyclic gear system, which in the present case is self-locking, as described, for example, in DE 44 36 101 A1, the relevant disclosure of which is expressly incorporated herein.

With the mounting of the fitting 10, the first fitting part 11 is, for example, connected tightly to the structure of the backrest 4, i.e. it is fixed with respect to the backrest part. The second fitting part 12 is then connected tightly to the structure of the seat part 3, i.e. it is fixed with respect to the seat part. Those assignments of the fitting parts 11 and 12 are preferred when the drive shaft 7 and the backrest 4 are to have the same direction of rotation, or when the position of the drive shaft 7 relative to the backrest 4 is to be constant in order, for example, to be able to fit to the structure of the backrest 4 an electrical motor rotating the drive shaft 7. However, the assignments of the fitting parts 11 and 12 can also be exchanged, i.e. the first fitting part 11 would then be fixed with respect to the seat part and the second fitting part 12 would be fixed with respect to the backrest. The latter assignments of the fitting parts 11 and 12 are preferred when the radial spacings of the fastening points between the fitting 10 and a relatively thin metal backrest sheet are to be as large as possible.

Each of the two fitting parts 11 and 12 can be approximately inscribed in a circular disk shape. The two fitting parts 11 and 12 are preferably composed of metal, in particular steel. In order to absorb the axially acting forces, i.e. in order to hold the fitting parts 11 and 12 together, an enclosing ring 13 is provided. Such a method of holding parts together by means of an enclosing ring is described, for example, in U.S. Pat. No. 6,799,806 A, the relevant disclosure of which is expressly incorporated herein. The preferably metal enclosing ring 13 is, with the mounting of the fitting 10, connected tightly to the second fitting part 12, being preferably first of all pressed on and then welded. Alternatively, the enclosing ring 13 is beaded, engaging over the second fitting part 12. At one of its end faces, the enclosing ring 13 has an edge bent radially inwards by means of which it engages radially over the outside of the first fitting part 11, optionally with the interposition of a sliding ring, without impeding the relative movement of the two fitting parts 11 and 12. From a structural point of view, the two fitting parts 11 and 12 therefore together form a disk-shaped unit.

In order to form the gear unit, an externally toothed wheel 16 is formed on the second fitting part 12, and an internally toothed ring 17 is formed on the first fitting part 11, the toothed wheel and the toothed ring meshing with each other. The diameter of the tip circle of the external toothing of the toothed wheel 16 is smaller by at least the depth of one tooth (of the toothed ring 17) than the diameter of the root circle of the internal toothing of the toothed ring 17. A corresponding difference in the number of teeth of the toothed wheel 16 and the toothed ring 17 of at least one tooth permits a rolling movement of the toothed ring 17 on the toothed wheel 16.

On the side facing the toothed wheel 16, the first fitting part 11 has, concentrically with the toothed ring 17, a collar 19 which can be integrally formed on (i.e. formed in one piece with) the first fitting part 11 as a collar formation or which can be secured thereto in the form of a separate sleeve. A driver 21 is supported rotatably in the collar 19 by means of a hub 22. The driver 21 is preferably composed of plastics material. The hub 22 of the driver 21 is provided centrally with a bore 23 for receiving the drive shaft 7. The profile of the bore 23 is configured to fit the profile of the drive shaft 7, in the present case a splined shaft profile. Adjoining its hub 22, the driver 21 has a covering disk 25 which is formed in one piece with the hub 22 and which has a larger diameter than the hub.

Supported on the collar 19 (with their curved inner surfaces) are two wedge segments 27 which support (with their curved outer surfaces) the second fitting part 12 by means of a slide bearing bush 28 which is pressed into the second fitting part 12 in a rotationally secure manner. The driver 21 has—spaced radially from the hub 22—a driver segment 29 which engages with clearance between the narrow sides of the wedge segments 27 and which is formed in one piece with the covering disk 25 and the hub 22. The mutually facing broad sides of the wedge segments 27 each receive, with a respective recess defined by projecting sections of material, a respective angled end finger of an omega spring 35 which presses the wedge segments 27 apart in the circumferential direction, it being possible during operation for the projecting material sections of the wedge segments 27 to touch and act on each other.

The driver 21 is secured axially to the outside of the first fitting part 11 by a clipped-on securing ring 43. Provided on the outside of the second fitting part 12, between the radially outer edge thereof and the covering disk 25, is a sealing ring 44 which is composed, for example, of rubber or soft plastics material and which is connected, in particular clipped, to the covering disk 25.

The wedge segments 27 (and the omega spring 35) define an eccentric which, in extension of the direction of eccentricity, presses the toothed wheel 16 into the toothed ring 17 at an engagement site so defined. When drive is effected by means of the rotating drive shaft 7, a torque is first of all transmitted onto the driver 21 and then, by means of the driver segment 29, onto the eccentric which slides along the slide bearing bush 28, shifting the direction of eccentricity and thus shifting the site of engagement of the toothed wheel 16 in the toothed ring 17, this presenting itself as a wobbling rolling movement, i.e. as a relative rotation with a superimposed wobbling movement. As a result, the inclination of the backrest 4 is continuously adjustable between several use positions.

Depending on the mounting of the fitting 10, the eccentric (i.e. the wedge segments 27) is supported by the second fitting part 12, while it, for its part, supports the first fitting part 11, or the relationships are exactly reversed, i.e. the eccentric rests on the first fitting part 11 and supports the second fitting part 12.

A receptacle 12a, the edge 12b of which is defined by the material of the second fitting part 12, is formed in the second fitting part 12 (in the present case concentrically with the toothed wheel 16). The slide bearing bush 28 is received by that receptacle 12a and rests against the edge 12b thereof (against the material of the second fitting part 12). The slide bearing bush 28 has an axial dimension (that is to say, along the axis of rotation of the eccentric) which is larger than the material thickness of the second fitting part 12. In order to give the receptacle 12a the same axial dimension as that of the slide bearing bush 28, in known fittings a small collar, which constitutes the edge 12b of the receptacle 12a and into which the slide bearing bush 28 is then pressed, is formed.

According to the invention, the edge 12b of the receptacle 12a is partially widened in the circumferential direction in that individual projections 12c are formed from the material (defining the edge 12b) of the second fitting part 12 as a result of operations of pushing through axially, that is to say, the material of the second fitting part 12 is forced through in places along the edge 12b of the receptacle 12a (with constant spacing in the circumferential direction) and thereby forms the projections 12c. This can take place, for example, by up to three quarters, preferably one quarter to half, of the material thickness of the second fitting part 12, for example, a total of half to three quarters of the edge 12b being re-formed along the circumference of the edge 12b. Each projection 12c is assigned a depression on the other end face of the fitting part 12 of the same axial dimension. With projections 12c provided in an axially alternating manner (and being otherwise identical), that is to say, with projections 12c along the circumference of the edge 12b alternating on the two end faces of the fitting part 12, a bearing support is thus created for the slide bearing bush 28, the axial dimension of which is, for example, twice the material thickness of the second fitting part 12 (normal material thickness plus twice the axial dimension of the projections 12c). With the solution according to the invention, it is in particular possible to use high-strength materials in the case of which it is no longer possible to produce a collar formation.

The number of projections 12c along the edge 12b of the receptacle 12a and their respective dimensions in the circumferential direction and in the axial direction, and their embossments on one or both sides with an alternating direction or in an other order, depend on the specific demands made on the bearing support to be created. In principle, any variant is possible, the embodiment shown in the drawings being preferred. Instead of the slide bearing defined by the slide bearing bush 28, a rolling bearing may also be provided which obtains a bearing support at the edge 12b of the receptacle 12a in a corresponding manner.

While specific embodiments of the invention have been described in detail to illustrate the application of the principles of the invention, it will be understood that the invention may be embodied otherwise without departing from such principles.

The invention claimed is:

1. A fitting for a vehicle seat, the fitting comprising:
a first fitting part on which is formed a toothed ring;
a second fitting part on which is formed a toothed wheel which meshes with the toothed ring, as a result of which the two fitting parts are in gear connection with each other;
a driver;
a rotatably supported circumferential eccentric, driven by the driver, for driving a relative rolling movement of the toothed wheel and the toothed ring: and
a bearing for the eccentric, which bearing is arranged at an edge of a receptacle of one of the two fitting parts, wherein the edge of the receptacle is partially widened along an edge circumference by means of individual axial projections.

2. A fitting according to claim 1, wherein the projections are in the form of embossments in material of the said one of the fitting parts.

3. A fitting according to claim 2, wherein each projection is assigned a depression on an opposite end face of the one of the fitting parts.

4. A fitting according to claim 1, wherein the projections are provided along the circumference of the edge of the receptacle in an alternating manner on each of two end faces of the said one of the fitting parts.

5. A fitting according to claim 1, wherein the bearing is in the form of a slide bearing or a rolling bearing.

6. A fitting according to claim 1, wherein the edge, partially widened by means of the axial projections, of the receptacle forms a support bearing for a slide bearing bush acting as the bearing.

7. A fitting according to claim 1, wherein the axial dimension of the projections amounts to up to three quarters of a material thickness of the said one of the fitting parts.

8. A fitting according to claim 1, wherein half to three quarters of the edge is re-formed along the circumference of the edge of the receptacle.

9. A fitting according to claim 1, wherein the said one of the fitting parts having the receptacle is composed of a high-strength material.

10. A vehicle seat comprising:
a seat part;
a backrest
a fitting, an inclination of the backrest being adjusted by means of the fitting, the fitting comprising:
a first fitting part with a toothed ring;
a second fitting part with a toothed wheel which engages with the toothed ring such that the first fitting part and the second fitting part are in gear connection with each other;
a driver;
a rotatably supported circumferential eccentric driven by the driver for driving a relative rolling movement of the toothed wheel and the toothed ring; and
a bearing for the eccentric, the bearing being arranged at an edge of a receptacle defined by one of the first fitting part and the second fitting part, the receptacle having an edge that is partially widened along an edge circumference by individual axial projections.

11. A vehicle according to claim 10, wherein the projections are in the form of embossments in material of said one of the first fitting part and the second fitting part.

12. A vehicle according to claim 11, wherein each projection is associated with a depression formed on an opposite end face of said one of the first fitting part and the second fitting part.

13. A vehicle according to claim 10, wherein the projections are provided along the circumference of the edge of the receptacle in an alternating manner on each of two end faces of said one of the first fitting part and the second fitting part.

14. A vehicle according to claim 10, wherein the bearing comprises one of a slide bearing and a rolling bearing for the eccentric.

15. A vehicle according to claim 10, wherein the edge is partially widened by the axial projections of the receptacle and forms a support bearing for the bearing for the eccentric.

16. A vehicle according to claim 10, wherein the axial dimension of the projections is up to three quarters of a material thickness of said one of the first fitting part and the second fitting part.

17. A vehicle according to claim 10, wherein half to three quarters of the edge is re-formed along the circumference of the edge of the receptacle.

18. A vehicle according to claim 10, wherein said one of the first fitting part and the second fitting part having the receptacle is formed of a high-strength material.

19. A fitting for a motor vehicle seat, the fitting comprising:
a first fitting part with a toothed ring;
a second fitting part with a toothed wheel which engages with the toothed ring such that the first fitting part and the second fitting part are in gear connection with each other;
a driver;
a rotatably supported circumferential eccentric driven by the driver for driving a relative rolling movement of the toothed wheel and the toothed ring; and
a bearing for the eccentric, the bearing being arranged at least partially within or formed by a receptacle defined by an edge of one of the first fitting part and the second fitting part, the edge having an adjacent end face with a plurality of individual axial projections that partially widen the edge along an edge circumference.

20. A fitting according to claim 19, wherein:
each of the axial projections is an embossment in material of said one of the first fitting part and the second fitting part; and
each projection has an associated depression on an opposite adjacent end face of said one of the first fitting part and the second fitting part.

* * * * *